US006575657B1

(12) United States Patent  
Reuter et al.

(10) Patent No.: US 6,575,657 B1  
(45) Date of Patent: Jun. 10, 2003

(54) DEVICE FOR FASTENING ATTACHMENT ELEMENTS ON A FRAME LEG OF A SWITCHGEAR CABINET RACK

(75) Inventors: Wolfgang Reuter, Burbach (DE); Rolf Benner, Herborn (DE)

(73) Assignee: Rittal-Werk Rudolf Loh GmbH & Co. KG, Herborn (DE)

(*) Notice: Subject to any disclaimer, the term of this patent is extended or adjusted under 35 U.S.C. 154(b) by 0 days.

(21) Appl. No.: 09/276,944

(22) Filed: Mar. 26, 1999

(30) Foreign Application Priority Data

Mar. 31, 1998 (DE) .......................... 198 14 268

(51) Int. Cl.⁷ ................. H05K 7/18; H02B 1/01; F16B 9/02
(52) U.S. Cl. ............... 403/231; 403/230; 403/256; 403/258; 248/225.21; 248/220.41; 248/220.42; 312/223.1; 312/265.1; 312/265.2; 312/265.3; 312/265.4; 211/26; 211/183
(58) Field of Search ............... 403/231, 230, 403/256, 258, 403, 282, 217, 218; 248/225.21, 225.11, 220.41, 220.42; 312/265.1, 265.4, 265.2, 265.3, 223.1; 211/26, 183

(56) References Cited

U.S. PATENT DOCUMENTS 5,749,476 A * 5/1998 Besserer et al.
5,807,008 A * 9/1998 Schwent et al.
5,930,972 A * 8/1999 Benner et al.
6,021,909 A * 2/2000 Tang et al.

FOREIGN PATENT DOCUMENTS

| DE | 94 05 831.8 | * | 7/1994 |
| DE | 195 37 016 C1 | | 10/1996 |
| DE | 195 37 016 | * | 10/1996 |
| DE | 195 44 834 C1 | | 2/1997 |
| DE | 297 23 545 | * | 12/1998 |

* cited by examiner

Primary Examiner—Lynne H. Browne  
Assistant Examiner—Ernesto Garcia  
(74) Attorney, Agent, or Firm—Pauley Petersen Kinne & Erickson

(57) ABSTRACT

A device for fastening of attachment elements, such as mounting rails, mounting plates, deposit plates and the like on a frame leg of a switchgear cabinet rack, wherein the frame legs are designed symmetrically in relation to their cross-sectional diagonal line and are aligned with the latter with the diagonal line of the rack. On the inside of the frame legs oriented toward the interior of the rack, the frame legs form a fastening receiver with two fastening profile sides which are disposed vertically in respect to each other and extend parallel to the facing outsides of the switchgear cabinet rack. The frame legs form system fastening receivers in the form of square or rectangular openings and fastening bores and make transitions into additional profile sides having corresponding rows of fastening receivers, which extend perpendicular to the facing exteriors of the switchgear cabinet rack. The fastening elements, which have fastening faces with fastening receivers in three directions respectively extending at right angles to each other, can be connected to the frame legs. The positioning of the same is made easier by specially designed fastening blocks, and connecting possibilities in three directions are created.

18 Claims, 3 Drawing Sheets

DEVICE FOR FASTENING ATTACHMENT ELEMENTS ON A FRAME LEG OF A SWITCHGEAR CABINET RACK

BACKGROUND OF THE INVENTION

1. Field of the Invention

This invention relates to a device for the fastening of attachment elements, such as mounting rails, mounting plates, deposit plates and the like on a frame leg of a switchgear cabinet rack, wherein the frame legs are designed symmetrically in relation to their cross-sectional diagonal line and are aligned with their cross-sectional diagonal lines with the diagonal line of the rack. On the inside of the frame legs oriented toward the interior of the rack, the frame legs comprise a fastening receiver with two fastening profile sides which are disposed vertically in respect to each other and extend parallel to the facing outsides of the switchgear cabinet rack. The frame legs form system fastening receivers in the form of square or rectangular openings and fastening bores and make transitions into additional profile sides having corresponding rows of fastening receivers, which extend perpendicularly with the facing exteriors of the switchgear cabinet rack. The fastening elements can be connected to the frame legs, which have fastening faces with fastening receivers in three directions respectively extending at right angles to each other.

2. Description of Prior Art

A device of this type is known from German Patent Publication DE 195 37 016 C1 which teaches a switchgear cabinet rack assembled from frame legs which are embodied mirror-reversed, i.e. symmetrically, in respect to their cross-sectional diagonal line, and are oriented with their cross-sectional diagonal lines on the diagonal line of the switchgear cabinet rack. On the interior of the switchgear cabinet rack, the profile sides of the frame legs, which extend vertically in respect to each other, form fastening receivers extending over the entire length of the profile sides.

By means of transition sections, the profile sides form a dovetail groove, which is open toward the interior of the switchgear cabinet rack. It is possible to insert a dovetail strip into the dovetail groove, which is supported in the dovetail groove, as a fastening element. A fastening block is inserted in an inserting position into the dovetail groove and is then rotated by 90° and brought into the fastening position. Although the fastening block is maintained in the fastening receiver, it can be continuously displaced in the fastening receiver.

SUMMARY OF THE INVENTION

It is one object of this invention to provide a device of the type discussed hereinabove, which has a fastening block, whereby simple fastening elements can be quickly and simply fixed in place on the frame leg and offer fastening possibilities for attachment elements in all directions.

This and other objects of this invention are achieved by a device for fastening attachment elements on a frame leg of a switchgear cabinet comprising fastening elements designed as fastening blocks, which are disposed against the profile sides of a frame leg, having two contact faces extending at right angles in respect to each other and are connected thereto. The contact faces of the fastening blocks make transitions into fastening faces which, when the fastening blocks have been attached to the frame leg, terminate flush with the additional profile sides of the frame leg. On their front faces extending vertically in respect to the longitudinal direction of the frame leg and on their fastening faces which are flush with the additional profile sides, the fastening blocks form fastening receivers designed as bores and/or threaded receivers.

The fastening block in accordance with this invention is simply inserted into the fastening receiver of the frame leg and connected to it. The fastening faces terminating flush with the additional profile sides provide connecting possibilities in two directions, which extend at right angles in respect to each other, without the attachment of attachment elements being hindered by the frame legs. A connecting possibility in a third direction is provided by the front faces of the fastening block, because the front faces extend vertically in respect to the longitudinal direction of the frame leg.

A positioning of the fastening blocks matched to the rows of fastening receivers formed by the profile sides of the frame legs is achieved whereby one of the contact faces is provided with shoulders, which can be introduced into fastening receivers of a profile side of the frame leg, and the other contact face can be screwed in place on the other profile side by means of a screw. In order to continue the grid of the system rows also with the fastening blocks, a further embodiment provides that the fastening faces of the fastening blocks form at least two bores and/or threaded receivers, which have a spacing in the longitudinal direction of the frame leg which corresponds to the grid dimensions of the system fastening receivers of the switchgear cabinet rack. The shoulders on a contact face permit the definite positioning in accordance with the grid dimensions of the system fastening receivers and do not interfere with the insertion of the fastening receivers of the frame leg.

In accordance with one embodiment of this invention, the screw-connection of the fastening block to the frame leg is achieved by the screw being inserted into a through-bore, which is offset in diameter and starts at the fastening face located on the parallel fastening face opposite the contact face, or the screw being inserted into slit-shaped recesses of the fastening faces and of a least one contact face, wherein the recesses form support strips for the screw head in the area of the contact face.

In accordance with another embodiment of this invention, the width of the recess in the fastening faces is matched to the diameter of the screw head of the screw, and the width of the recess in the contact face is matched to the diameter of the threaded portion of the screw. As a result, the screw-connection possibilities can still be further expanded in that both contact faces form a recess for a screw which only extends over a portion of the width of the contact faces and starts at the facing fastening faces.

In accordance with a further embodiment of this invention, the contact faces and the fastening faces make transitions into each other by means of transition sections extending parallel to each other. The fastening blocks have sufficient room in the fastening receiver of the frame leg and do not unnecessarily project from the frame leg into the interior of the switchgear cabinet rack.

In accordance with yet another embodiment of this invention, the profile sides of the frame leg are a part of a dovetail-shaped fastening receiver and, with the fastening block attached to the frame leg, the transition sections extend parallel to the groove bottom. As a result, the fastening blocks fastened on the frame legs can be additionally supported in the groove bottom of the dovetail groove.

The fastening blocks can be cost-effectively produced as simple injection-molded elements made of metal or plastic.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
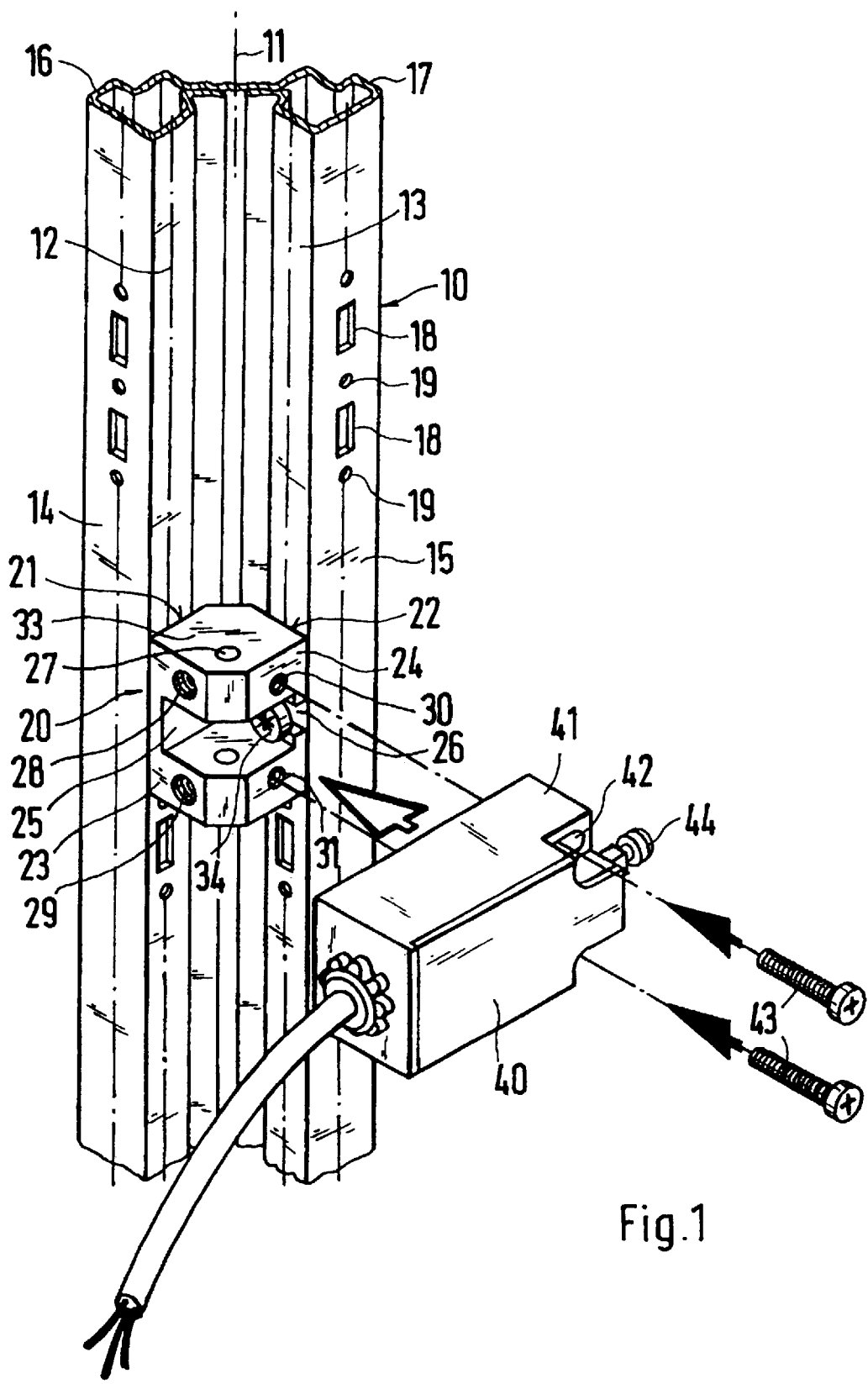
FIG. 1 is a perspective view of a frame leg, looking toward its interior, with a fastening block fastened thereto, on which an attachment element can be installed, in accordance with one embodiment of this invention.

The frame leg 10 shown in FIG. 1 is designed to be mirror-reversed in relation to its cross-sectional diagonal line 11, i.e. it is symmetrical. The frame legs 10 are installed in a switchgear cabinet rack in such a way that their cross-sectional diagonal lines 11 coincide with diagonal lines of the switchgear cabinet rack. Facing the interior of the switchgear cabinet rack, the frame leg 10 comprises a fastening receiver, which is symmetrical in relation to the cross-sectional diagonal line 11, is defined by the two profile sides 12 and 13 extending vertically in respect to each other and extends over the entire longitudinal dimension of the frame leg 10. The profile sides 12 and 13 extend vertically in respect to the outsides of the switchgear cabinet rack, abutting each other in the area of the frame leg 10, which in turn are also defined by the outer profile sides 16 and 17 of the profile leg 10. In accordance with this embodiment of the invention, the fastening receptacle of the frame leg 10 is completed, extending over further sections, to form a dovetail groove, and the profile sides 12 and 13 make a transition by means of additional profile sides 14 and 15 into the outer profile sides 16 and 17. The additional profile sides 14 and 15 extend vertically in respect to the profile sides 12 and 13, and, therefore, also vertically in respect to the facing outsides of the switchgear cabinet rack, or respectively the outer profile sides 16 and 17 of the frame leg 10.

As shown in FIG. 1, the profile sides 12 and 13 as well as the additional profile sides 16 and 17 form rows of system fastening receivers consisting of rectangular shaped openings 18 and fastening bores 19, which have been cut in a uniform grid shape.

To form connecting possibilities in all three dimensions, the device employs fastening elements embodied as fastening blocks 20, which can be cost-effectively produced as injection-molded elements made of metal or plastic.

Figure 2:
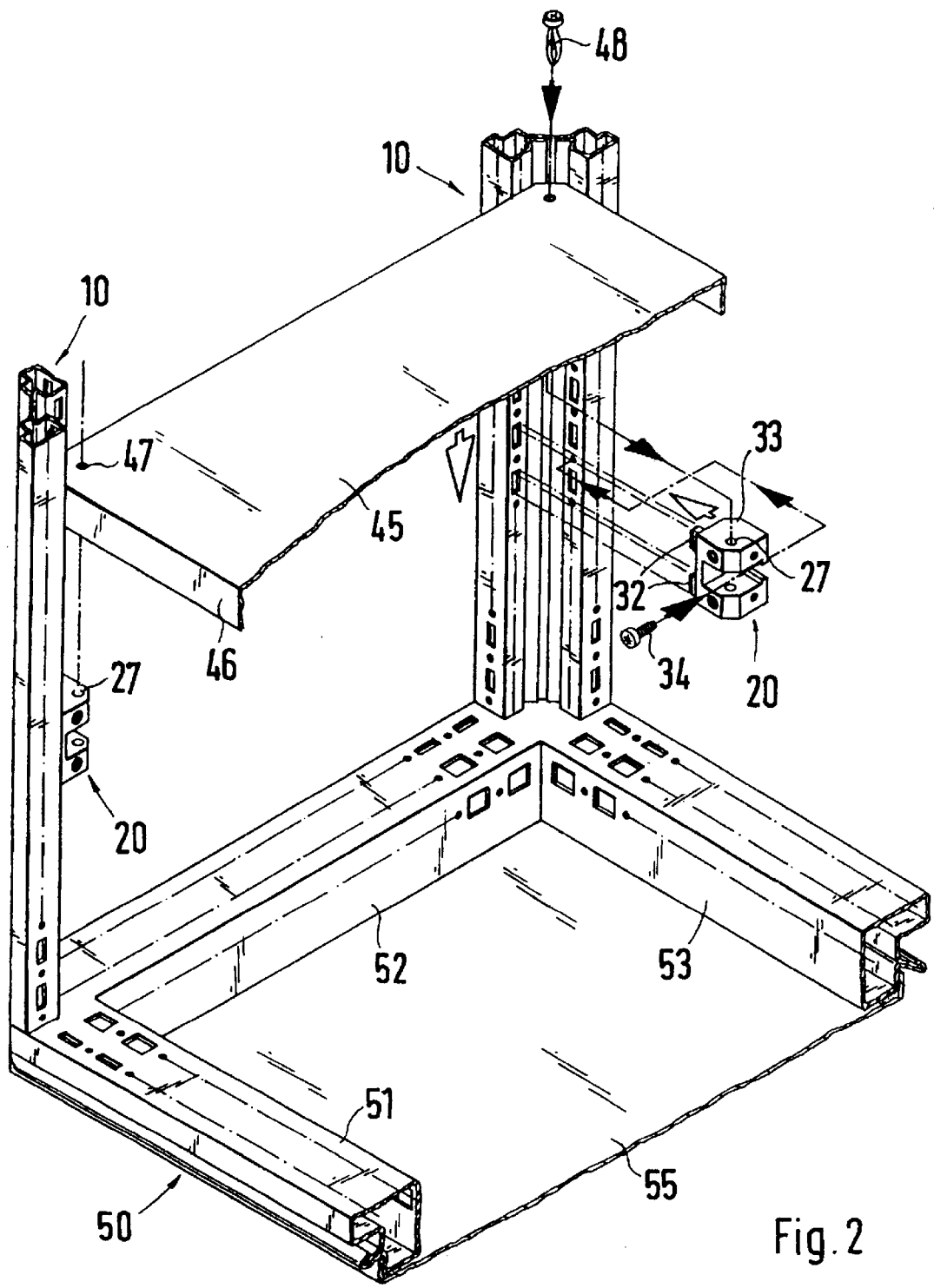
FIG. 2 is a perspective view of a portion of a switchgear cabinet rack with the fastening of a horizontal deposit plate.

These solidly embodied fastening blocks 20 comprise two contact faces 21 and 22, which are at right angles to each other, which can be placed against the profile sides 12 and 13 and which can be connected to them. The contact faces 21 and 22 of the fastening block 20 make transitions into fastening faces 23 and 24, extending vertically in respect to them and, following the attachment of the fastening block 20 to the frame leg 10, terminate flush with the additional profile sides 14 and 15 of the frame leg 10. Slit-shaped recesses 25 and 26, which do not extend as far as the contact faces 21 and 22, are formed by the fastening faces 23 and 24. In accordance with this embodiment, the width of the recess 25 is matched to the diameter of the screw head of the screw 34. The recess 26 in the fastening face 24 is open toward the contact face 22, having a width which corresponds to the diameter of the threaded portion of the screw 34. As can be seen in FIG. 2, in accordance with one embodiment of this invention, shoulders 32 are formed on the contact face 21, which can be inserted into openings 18 of the profile side 12 of the frame leg 10. As a result, the fastening block 20 can be positioned in the grid of system fastening receivers before it is screwed tight on the frame leg 10. The recess 26 in the fastening face 23 can also be open and reduced in width accordingly, so that the fastening block 20 can be selectively screwed together with the profile side 12 or 13, wherein a bore 19 of the system fastening receiver is occupied.

The bore 27 in the front faces 33 of the fastening block 20 provides connecting possibilities in a third direction.

The fastening faces 23 and 24 form two threaded receivers 28 and 29, or respectively 30 and 31, which are spaced in the longitudinal direction of the frame leg 10 in a way corresponding to the grid dimensions of the system fastening receivers.

The contact faces 21 and 22 as well as the fastening faces 23 and 24 of the fastening block 20 make a transition into each other by means of transition sections extending parallel to each other and toward the groove bottom of the dovetail grove. The fastening block 20 can be supported on the groove bottom and does not project unnecessarily far from the frame leg 10 into the interior of the switchgear cabinet rack.

As shown in FIG. 1, an attachment element, such as a switch 40, which is actuable by means of an actuating member 44, can be screwed in place on the fastening block 20, if it has a fastening flange 42 with two elongated holes 42, spaced apart in accordance with the grid dimensions, for fastening screws 43. The fastening screws 43 are screwed into the threaded receivers 30 and 31 of the fastening face 24. The switch 40 can also be fixed in the same way on the fastening face 23 of the fastening block 20.

The two rear or front vertical frame legs 10, as well as the horizontal frame legs 51, 52 and 53 in the bottom frame 50, are shown in FIG. 2. The bottom frame 50 is closed off by bottom plate 55. Four fastening blocks 20 are attached in the manner described by means shown in FIG. 1 on the two vertical frame legs 10 of the front and back at the same height position (predetermined by the system fastening receiver).

A deposit plate 45 comprising a beveled edge 46 is placed on the upward facing front faces 33 of the fastening blocks 20. In its corner areas, the deposit plate 45 forms fastening bores 47 oriented toward the bores 27 of the fastening blocks 20, into which fastening elements 48 can be inserted. In accordance with this embodiment of the invention, the fastening elements 48 are designed as spreader elements, which are locked in place in the area of the recesses 25 and 26 of the fastening block 20.

Figure 3:
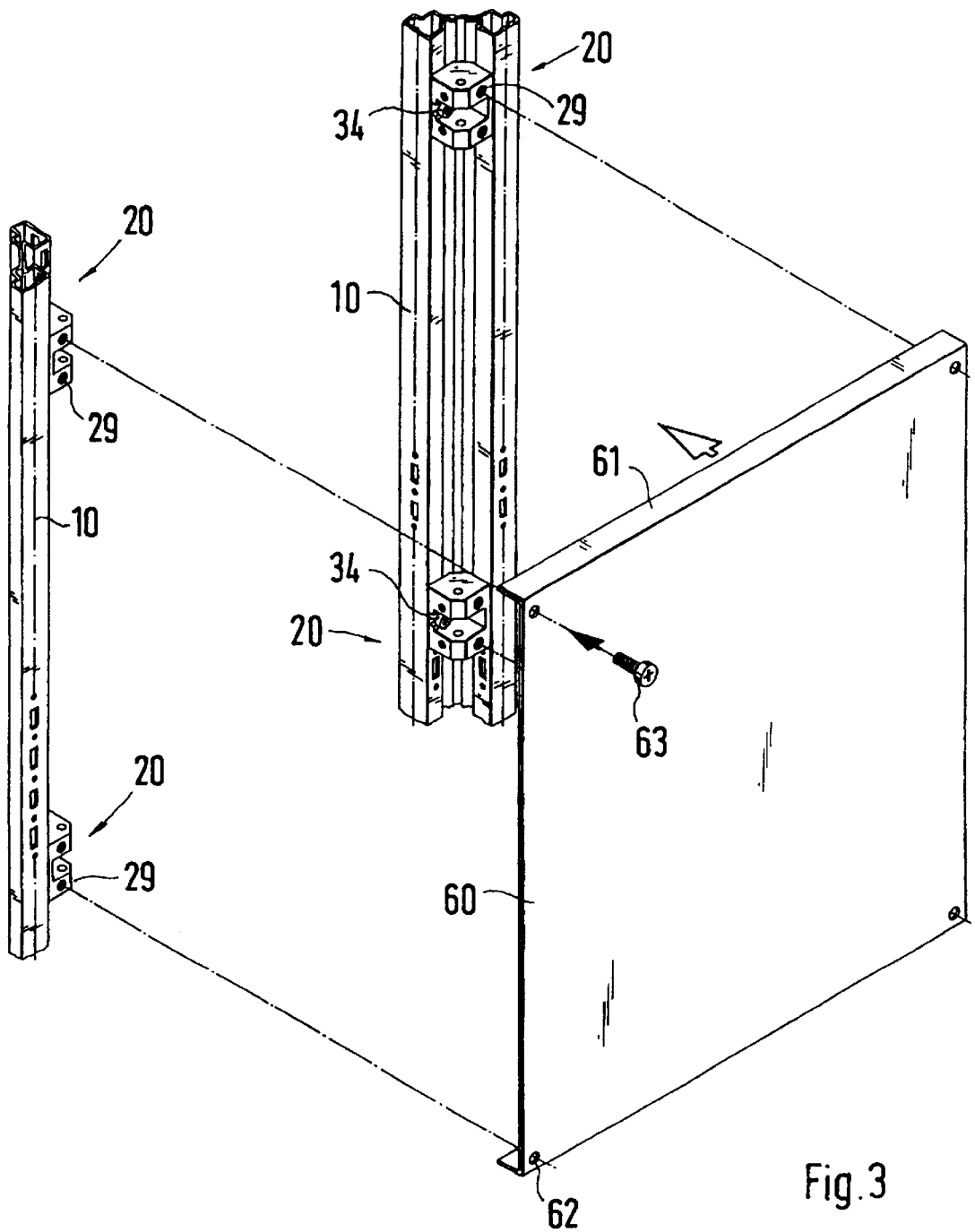
FIG. 3 is a perspective view of a portion of a switchgear cabinet rack with the fastening of a vertical deposit plate.

As shown in FIG. 3, a vertical mounting plate 60 can be fastened in a similar manner on two adjoining frame legs 10 of a switchgear cabinet rack. To this end, two fastening blocks 20 are positioned and fastened on each frame leg 10 in such a way that the horizontal edge 61 of the mounting plate 60 covers the upper front face 33 of the upper fastening blocks 20, and extends under the lower front face 33 of the lower fastening blocks 20. The mounting plate 60 then can be placed against the facing fastening faces of the four fastening blocks 20 and can be screwed together with it by fastening screws 63. The mounting plate 60 is provided with fastening bores 62, which are oriented toward the threaded receivers 28, 29, 30 or 31.

In place of the recesses 25 and 26, in accordance with one embodiment of this invention, the fastening blocks 20 form bores with an offset diameter for the screws 34, which start at one fastening face and are oriented toward the contact surface extending parallel with it.

What is claimed is:

1. In a device for fastening attachment elements on frame legs of a switchgear cabinet rack, the frame legs being symmetrical in relation to a cross-sectional diagonal line thereof and being aligned with said cross-sectional diagonal line, on an inside of the frame legs oriented toward an interior of the switchgear cabinet rack, each of the frame legs having two fastening profile sides disposed vertically in respect to each other, and forming a plurality of system fastening receivers in a form of at least one of square and rectangular openings, and a plurality of fastening bores, which extend perpendicular to the switchgear cabinet rack, and at least one fastening element connected with at least one of the frame legs and having a plurality of fastening faces forming at least one fastening receiver in each of three directions respectively extending at right angles to each other, an improvement comprising:

said at least one fastening element comprising a fastening block (20), disposed against the profile sides (12, 13) of one of the frame legs (10); two contact faces (21, 22) of the fastening block (20) extending at right angles in respect to each other and connected to the one of the frame legs (10);

each of the contact faces (21, 22) of the fastening block (20) transitioning into a fastening face (23, 24), and when the fastening block (20) is attached to the frame leg (10), the contact faces (21, 22) terminating flush with a corresponding additional profile side (14, 15) of the frame leg (10);

one of the contact faces (21) includes at least one shoulder (32) insertable into one of the system fastening receivers (18) of the frame leg (10);

the other contact face (22) being suitable for screwing in place on another said profile side (13) by a screw (34);

the fastening block (20) having the fastening receivers each on a front face (33) of the fastening block (20) extending vertically in respect to a longitudinal direction of the frame leg (10) and on said fastening face (23, 24) of the fastening block (20) which is flush with the additional profile side (14, 15), the fastening receivers being in a form of at least one of bores (27) and threaded receivers (28, 29, 30, 31); and the screw (34) inserted into a plurality of slit-shaped recesses (25 and 26) of the fastening faces (23, 24) and at least one of said contact faces (22), wherein one of said slit-shaped recesses (26) comprises a plurality of support strips for a screw head in an area of the contact face (22).

2. A device in accordance with claim 1, wherein the screw (34) is inserted into one of the fastening bores.

3. A device in accordance with claim 1, wherein a width of one of said slit-shaped recesses (25) in the fastening faces (23, 24) is matched to a diameter of the screw head of the screw (34), and the width of another of said slit-shaped recesses (26) in the contact face (22) is matched to the diameter of a threaded portion of the screw (34).

4. A device in accordance with claim 1, wherein fastening faces (23, 24) of the fastening block (20) form at least two of said at least one of said bores and said threaded receivers (28, 29, 30, 31), which have a spacing in the longitudinal direction of the frame leg (10) which corresponds to a grid dimension of the system fastening receivers of the switchgear cabinet rack.

5. A device in accordance with claim 1, wherein both of said contact faces (21, 22) form a recess (26) for a screw (34), which only extend over a portion of a width of the contact faces (21, 22) and start at the fastening faces (23, 24).

6. A device in accordance with claim 3, wherein both of said contact faces (21, 22) form a recess (26) for a screw (34), which only extend over a portion of a width of the contact faces (21, 22).

7. A device in accordance with claim 5, wherein the contact faces (21, 22) and the fastening faces (23, 24) make transitions into each other by a plurality of transition sections extending parallel to each other.

8. A device in accordance with claim 6, wherein the contact faces (21, 22) and the fastening faces (23, 24) make transitions into each other by a plurality of transition sections extending parallel to each other.

9. A device in accordance with claim 7, wherein the profile sides (12, 13) of the frame leg (10) define a part of a dovetail-shaped fastening receiver and, with the fastening block (20) attached to the frame leg (10), a plurality of transition sections extend parallel with a groove bottom of said dovetail-shaped fastening receiver.

10. A device in accordance with claim 8, wherein the profile sides (12, 13) of the frame leg (10) define a part of a dovetail-shaped fastening receiver and, with the fastening block (20) attached to the frame leg (10), a plurality of transition sections extend parallel with a groove bottom of said dovetail-shaped fastening receiver.

11. A device in accordance with claim 9, wherein the fastening block (20) is an injection-molded element made of a material selected from the group consisting of metal and plastic.

12. A device in accordance with claim 10, wherein the fastening block (20) is an injection-molded element made of a material selected from the group consisting of metal and plastic.

13. A device in accordance with claim 11, wherein the fastening faces (23, 24) of the fastening block (20) form at least two of said at least one of said bores and said threaded receivers (28, 29, 30, 31), which have a spacing in the longitudinal direction of the frame leg (10) which corresponds to a grid dimension of the system fastening receivers of the switchgear cabinet rack.

14. A device in accordance with claim 12, wherein the fastening faces (23, 24) of the fastening block (20) form at least two of said at least one of said bores and said threaded receivers (28, 29, 30, 31), which have a spacing in the longitudinal direction of the frame leg (10) which corresponds to a grid dimension of the system fastening receivers of the switchgear cabinet rack.

15. In a device for fastening attachment elements, on frame legs of a switchgear cabinet rack, the frame legs being symmetrical in relation to a cross-sectional diagonal line thereof and being aligned with said cross-sectional diagonal line, on an inside of the frame legs oriented toward an interior of the switchgear cabinet rack, each of the frame legs having two fastening profile sides disposed vertically in respect to each other, and forming a plurality of system fastening receivers in a form of at least one of square and rectangular openings, and a plurality of fastening bores, which extend perpendicular to the switchgear cabinet rack, and at least one fastening element connected with at least one of the frame legs and having a plurality of fastening faces forming at least one fastening receiver in each of three directions respectively extending at right angles to each other, an improvement comprising:

said at least one fastening element comprising a fastening block (20), disposed against the profile sides (12, 13) of one of the frame legs (10); two contact faces (21, 22) of the fastening block (20) extending at right angles in respect to each other and connected to the one of the frame legs (10);

each of the contact faces (21, 22) of the fastening block (20) transitioning into a fastening face (23, 24), and when the fastening block (20) is attached to the frame leg (10), the contact faces (21, 22) terminating flush with a corresponding additional profile side (14, 15) of the frame leg (10);

one of the contact faces (21) comprising at least one shoulder (32) insertable into one of the system fastening receivers (18) of the frame leg (10);

the other contact face (22) being suitable for screwing in place on another said profile side (13) by a screw (34);

the fastening block (20) having the fastening receivers each on a front face (33) of the fastening block (20) extending vertically in respect to a longitudinal direction of the frame leg (10) and on said fastening face (23, 24) of the fastening block (20) which is flush with the additional profile side (14, 15), the fastening receivers being in a form of at least one of bores (27) and threaded receivers (28, 29, 30, 31); and one of said contact faces (21, 22) forming a recess (26) for a screw (34), which only extends over a portion of a width of one of the contact faces (21, 22) and starts at one of the fastening faces (23, 24).

16. A device in accordance with claim 15, wherein the contact faces (21, 22) and the fastening faces (23, 24) make transitions into each other by a plurality of transition sections extending parallel to each other.

17. A device in accordance with claim 15, wherein
the contact faces (21, 22) and the fastening faces (23, 24) make transitions into each other by a plurality of transition sections extending parallel to each other.

18. A device in accordance with claim 16, wherein
the profile sides (12, 13) of the frame leg (10) define a part of a dovetail-shaped fastening receiver and, with the fastening block (20) attached to the frame leg (10), a plurality of transition sections extend parallel with a groove bottom of said dovetail-shaped fastening receiver.

\* \* \* \* \*